May 5, 1959     H. WILSON     2,884,798
ROUND CHAIN SAW SPROCKET
Filed Aug. 9, 1957

INVENTOR.
Harry Wilson
BY Victor J. Evans & Co.
ATTORNEYS

United States Patent Office 2,884,798
Patented May 5, 1959

2,884,798
ROUND CHAIN SAW SPROCKET
Harry Wilson, Lewisburg, Pa.
Application August 9, 1957, Serial No. 677,339
4 Claims. (Cl. 74—243)

This invention relates to a sprocket, and more particularly to a sprocket for a chain saw.

The object of the invention is to provide a sprocket which is of round formation and which is adapted to be used instead of the conventional toothed sprockets which have heretofore been used for driving chain saws.

Another object of the invention is to provide a round chain saw sprocket which will have a longer life than a toothed sprocket, and wherein the parts thereof can be quickly and easily replaced and wherein by using the sprocket of the present invention, the life of the chain or saw will be increased since there will be less shock on the chain in view of the fact that the chain will travel around the sprocket more easily and smoothly.

A further object of the invention is to provide a round chain saw sprocket which is extremely simple and inexpensive to manufacture.

Other objects and advantages will be apparent during the course of the following description.

In the accompanying drawings, forming a part of this application, and in which like numerals are used to designate like parts throughout the same.

Figure 5:
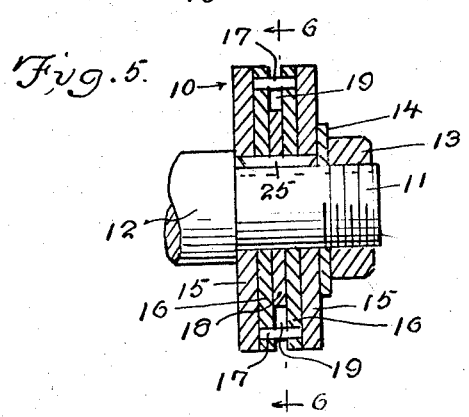
Figure 5 is a sectional view taken through the sprocket.
Figure 6:
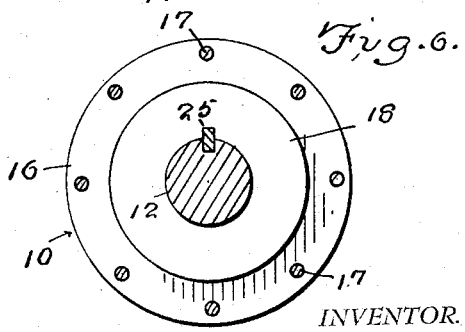
Figure 6 is a sectional view taken on the line 6—6 of Figure 5.

Referring in detail to the drawings, the numeral 10 indicates the sprocket of the present invention which is shown keyed to or mounted on the reduced diameter end portion 11 of a shaft 12, and the sprocket 10 is held in place by means of a nut 13 which abuts a washer 14, Figure 5.

The sprocket 10 of the present invention includes a pair of outer plates 15 which each have a circular formation and the plates 15 are of the same size and are arranged in spaced parallel relation with respect to each other.

Arranged between the pair of plates 15 is a pair of spaced parallel disks 16, and the outer diameter of the disks 16 is the same as the outer diameter of the plates 15. A plurality of spaced parallel pins 17 extend between the disks 16, as shown in the drawings.

The sprocket 10 further includes a spacer member 18 of circular formation, and the spacer member 18 is positioned between the pair of disks 16. The spacer member 18 is of less diameter than the disks 16 and plates 15, wherein an annular groove or recess 19 is provided.

Referring to Figures 1–4 of the drawings, there is shown a portion of a chain saw 20 which is adapted to be used with the sprocket 10 of the present invention, and the chain saw 20 is of the type that includes a plurality of guide links 21 which have portions thereof projecting into the groove 19 of the sprocket 10. The chain saw 20 further includes side links 22 which are connected to the guide links 21 through the medium of rivets 23, and the numeral 24 indicates cutting teeth on the side links 22.

The numeral 25 indicates a key which can be used for securing the sprocket 10 to the shaft 12.

From the foregoing, it is apparent that there has been provided a sprocket which is an improvement over existing sprockets such as the prior toothed sprockets. In use, the sprocket 10 is adapted to be mounted on a shaft such as the shaft 12, and the sprocket 10 is adapted to be used with a chain such as the chain 20. The chain 20 forms part of a saw, and the chain 20 includes the plurality of side links 22 which are connected to the guide links 21 through the medium of rivets 23, and there is further provided the cutting teeth 24 which are formed on the guide links 21.

The sprocket 10 includes the outer plates 15 of circular shape, and the plates 15 are of the same size. Furthermore, the sprocket 10 includes the inner disks 16 which are of the same diameter as the plates 15, and the disks 16 have the pins 17 extending therebetween. The circular spacer member 18 is arranged between the disks 16, and the spacer member 18 is of less diameter than the disks 16 so as to define the annular groove 19 into which projects the inner end portions of the guide links 21.

Figure 1:
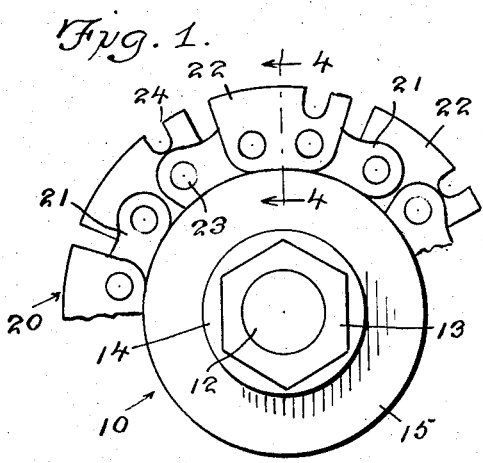
Figure 1 is a side elevational view showing the sprocket of the present invention having a portion of a chain arranged in engagement therewith.
Figure 2:
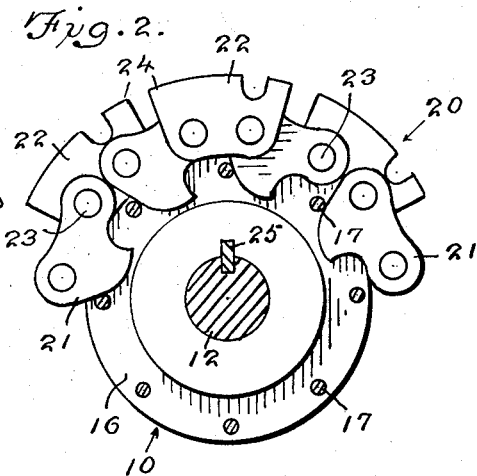
Figure 2 is a view similar to Figure 1 but showing parts broken away and in section.
Figure 3:
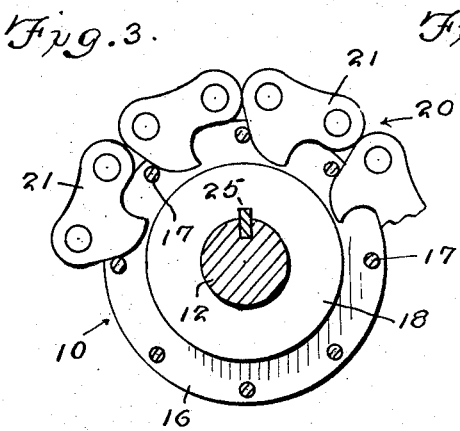
Figure 3 is a view similar to Figure 2, but showing the guide links.
Figure 4:
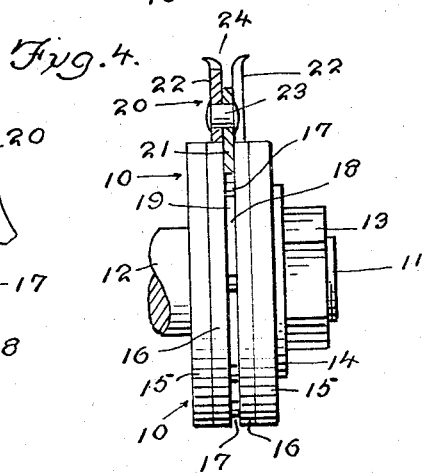
Figure 4 is a sectional view taken substantially on the line 4—4 of Figure 1.

It will be seen that when the chain is being used in connection with the sprocket 10, that the inner portions of the guide links 21 project into the groove 19, while the side links 22 engage the outer periphery of the disks 16, as for example as shown in Figure 4 and this construction insures that the chain saw will operate more smoothly and efficiently.

The round chain saw sprocket of the present invention is adapted to be used instead of toothed sprockets which are now in use for driving chain saws. The parts can be made in different shapes and sizes and of any suitable material. The round sprocket of the present invention can be adapted to chain saws of different constructions whereby it can be used with different types of saws or chains.

Some of the advantages of the round sprocket of the present invention are as follows. It will have a longer life than a toothed sprocket because the pins 17 can be turned end to end in the disks 16 to offer a new wearing place in relation to the ends. Also, any of the parts can be easily and quickly replaced, and the disks 16 can be changed, switched, or turned to permit the part of the chain bearing on the edge or outer periphery to be renewed without the necessity of replacing these parts, and the disks may also be trued up with a file or grinidng wheel if necessary.

Furthermore, the life of the chain rivets 23 will be lengthened because there will be less shock since the parts will follow around the sprocket more easily and smoothly. The pins 17 pass all the way through the disks 16 and the pins 17 are held in place by the plates 15. The spacer member 18 is of a thickness to be determined by the various thicknesses of chain saw links 21. After the sprocket has been assembled, it is mounted on a splined or keyed shaft and held on with a nut such as the nut 13. The dimensions of the various parts can be varied, depending upon the requirements of the machine with which it is being used. When the outer periphery of the parts such as the parts 16 become worn, they can be reversed so as to present another surface for the chain to bear upon and this is an important advantage.

The sprocket is simple and inexpensive to manufacture and will operate efficiently even at high speeds. The sprocket is round and the side links 22 bear on the outer periphery of the sprocket. Only the guide links 21 travel in the groove 19. The round sprocket of the present invention will cause less wear on the chain rivets 23 and less vibration on the machine at all speeds. Furthermore, by having the side links 22 bearing against the disks 16, if a pin breaks, the chain cannot become wedged between the disks 16 in the groove 19 and there will be no damage to the chain or sprocket and the sprocket will continue to pull the chain because some of the pins can be removed, provided they are not adjacent, and the apparatus will still operate until replaced.

Manufacture or production of the sprocket of the present invention is very simple and for example the parts, with the exception of the pins, can be made with a punch press and there are no bolts or rivets required for assembling the device. The parts such as the disks 16 are interchangeable and reversible so that if the periphery of one edge becomes worn, such a member can be easily reversed so as to provide a new edge on the other side for the side links of the chain to bear on and they can be easily replaced or even trued up. The plates 15 serve to hold the parts in their proper assembled position without riveting the parts together, and this permits quick and easy replacement of parts which may become worn or broken. The plates 15 also serve as spacer collars for accurate alignment of the groove in the sprocket with the groove in the guide bar of the chain saw machine and may also serve to strengthen the sprocket.

I claim:

1. In a sprocket for a chain saw of the type including guide links, side links connected to said guide links, cutting teeth on said side links, said sprocket comprising a first pair of spaced parallel plates of circular shape, a pair of circular disks arranged between said pair of plates and abutting the inner surfaces thereof, a spacer member of circular shape interposed between said pair of disks, said spacer member being of less diameter than said disks and plates so as to define an annular groove for receiving the inner portions of said guide links, and a plurality of spaced parallel pins extending between said pair of disks and means securing said plates, disks and spacer members in assembled relationship.

2. In a sprocket for a chain saw of the type including guide links, side links connected to said guide links, cutting teeth on said side links, said sprocket comprising a first pair of spaced parallel plates of circular shape, a pair of circular disks arranged between said pair of plates and abutting the inner surfaces thereof, a spacer member of circular shape interposed between said pair of disks, said spacer member being of less diameter than said disks and plates so as to define an annular groove for receiving the inner portions of said guide links, a plurality of spaced parallel pins extending between said pair of disks, said disks being of the same outside diameter as said plates and means securing said plates, disks and spacer members in assembled relationship.

3. In a sprocket for a chain saw of the type including guide links, side links connected to said guide links, cutting teeth on said side links, said sprocket comprising a first pair of spaced parallel plates of circular shape, a pair of circular disks arranged between said pair of plates and abutting the inner surfaces thereof, a spacer member of circular shape interposed between said pair of disks, said spacer member being of less diameter than said disks and plates so as to define an annular groove for receiving the inner portions of said guide links, a plurality of spaced parallel pins extending between said pair of disks, said disks being of the same outside diameter as said plates, said side links bearing against the outer periphery of said disks and means securing said plates, disks and spacer members in assembled relationship.

4. In a sprocket for a chain, a first pair of spaced parallel plates of circular shape, a pair of circular disks arranged between said pair of plates and abutting the inner surfaces thereof, a spacer member of circular shape interposed between said pair of disks, said spacer member being of less diameter than said disks and plates so as to define an annular groove, a plurality of spaced parallel pins extending between said pair of disks, said disks being of the same outside diameter as said plates, and means securing said plates, disks and spacer members in assembled relationship.

References Cited in the file of this patent

UNITED STATES PATENTS

| 1,526,451 | Wolf | Feb. 17, 1925 |

FOREIGN PATENTS

| 21,321 | France | May 8, 1920 |
| | (1st addition of No. 469,550) | |